United States Patent
Draughn et al.

(10) Patent No.: US 6,892,105 B2
(45) Date of Patent: May 10, 2005

(54) METHOD OF PRODUCING A WOOD FINISH AT A LOCATION REMOTE FROM WHERE THE WOOD FINISH IS DESIGNED

(75) Inventors: John D. Draughn, High Point, NC (US); Jennifer M. Westmoreland, Thomasville, NC (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 10/744,191

(22) Filed: Dec. 22, 2003

(65) Prior Publication Data

US 2004/0243265 A1 Dec. 2, 2004

Related U.S. Application Data

(60) Provisional application No. 60/437,569, filed on Dec. 31, 2002.

(51) Int. Cl.$^7$ ................................................. G06F 19/00
(52) U.S. Cl. ......................................................... 700/97
(58) Field of Search ............................ 700/95–98, 117, 700/122, 130–133; 705/26, 27; 345/581–583, 588, 589, 591, 593–595

(56) References Cited

U.S. PATENT DOCUMENTS

| | | | |
|---|---|---|---|
| 5,966,454 A | * 10/1999 | Thomas et al. ............. | 382/111 |
| 6,005,969 A | 12/1999 | Thomas et al. ............. | 382/162 |
| 6,331,858 B2 | 12/2001 | Fisher ......................... | 345/582 |
| 6,381,510 B1 | 4/2002 | Amidhozour et al. ....... | 700/130 |
| 6,389,322 B1 | 5/2002 | Park et al. .................... | 700/98 |
| 6,405,111 B2 | 6/2002 | Rogers et al. ................ | 701/33 |
| 6,459,435 B1 | 10/2002 | Eichel ......................... | 345/588 |
| 2002/0184114 A1 | * 12/2002 | Jorgensen .................... | 705/27 |
| 2004/0236634 A1 | * 11/2004 | Ruuttu ......................... | 705/26 |
| 2004/0243265 A1 | * 12/2004 | Draughn et al. ............. | 700/98 |

FOREIGN PATENT DOCUMENTS

| | | | |
|---|---|---|---|
| EP | 1020807 A1 | * | 7/2000 |
| WO | WO 00/60513 A1 | * | 10/2000 |
| WO | WO 01/24077 A1 | * | 4/2001 |

* cited by examiner

*Primary Examiner*—Maria N. Von Buhr
(74) *Attorney, Agent, or Firm*—Arthi K. Tirey; Robert E. McDonald; Paul R. Katterle

(57) ABSTRACT

A method of finishing a wood product, such as furniture, that is being manufactured at a location remote from a location where the finish for the wood product is designed. The method uses a proprietary information management and tracking (IMT) software system in conjunction with a digital image production and management (DIPM) system to produce a wood finish information file that is transmitted via email over the Internet from the design location to the remote location.

1 Claim, 13 Drawing Sheets

METHOD OF PRODUCING A WOOD FINISH AT A LOCATION REMOTE FROM WHERE THE WOOD FINISH IS DESIGNED

CROSS-REFERENCE TO RELATED APPLICATION

This application claims the benefit of U.S. provisional patent application No. 60/437,569 filed on Dec. 31, 2002, the entirety of which is hereby incorporated by reference.

BACKGROUND OF THE INVENTION

The present invention relates to a method for finishing wood products and, more specifically, to a method of finishing furniture being manufactured at a location remote from a location where the finish for the furniture is designed.

Conventionally, a finish for a wood product, such as furniture, is designed at, or in a location proximate to, a location where the wood product is to be manufactured. Typically, a wood product designer, in conjunction with a finish specialist, designs the wood finish. The finish specialist then creates a finishing schedule to produce the wood finish and typically prepares a color standard or guide panel having the final wood finish. The finishing schedule and guide panel are then physically transported to the manufacturing location (if they aren't already located there) where they are used to produce the finish for the manufactured wood product. The coatings and other wood treatments that are used to prepare the finishing schedule and the guide panel are also used to create the finish on the wood product.

In recent years, there has been a move toward globalization, wherein goods are manufactured at locations remote from where the goods are designed. For example, many wood product companies in the U.S. have headquarters and design facilities in the Southeast U.S., but their wood products are manufactured in other countries, such as China. This large separation in distance between design facilities and manufacturing facilities make it more difficult to accurately replicate a wood finish design on a manufactured wood product. For example, it is costly and time consuming to ship guide panels and other finishing information over great distances.

The present invention is directed to a method that will decrease the cost and increase the speed of replicating a wood finish design on a manufactured wood product, especially when the design of the wood finish and the manufacture of the wood product are separated by a great distance. The present invention utilizes the Internet and electronic mail (email).

The Internet is a worldwide decentralized network of computer networks that permits computers to communicate with each other. The computer networks comprising the Internet are run by various organizations, including corporations, universities and government agencies and work together in a democratic, loosely organized alliance. Networks may be connected together by dedicated telephone lines, fiber optic cables, high speed DSL (Digital Subscriber Line) connections, special ISDN (Integrated Services Digital Network) telephone lines, or by satellite. Information is transmitted over the Internet in packets. More specifically, information is broken into small packets, sent over many different routes at the same time, and then reassembled at the receiving end. Two protocols are responsible for this breaking, routing and reassembling of information: the Internet Protocol (IP), which routes the packets of information, and the Transmission Control Protocol (TCP), which breaks the information into packets and recombines them on the computer that receives the information. In order for a personal computer to take full advantage of the Internet, the computer must have special software that understands and interprets the Internet's TCP/IP protocols. This software is referred to as a socket or a TCP/IP stack.

In 1989, a new type of information system known as the World-Wide-Web ("the Web") was introduced to the Internet. The architecture of the Web follows a conventional client-server model. The terms "client" and "server" are used to refer to a computer's general role as a requester of data (the client) or provider of data (the server). Web clients and Web servers communicate using a protocol called "HyperText Transfer Protocol" (HTTP). A browser is an exemplary Web client for use in requesting Web pages and files from Web servers. A Web server waits for a Web client, such as a browser, to open a connection and to request a specific Web page or application. The Web server then sends a copy of the requested item to the Web client, closes the connection with the Web client, and waits for the next connection. HTTP allows a browser to request a specific item, which a Web server then returns and the browser renders. To ensure that browsers and Web servers can communicate unambiguously, HTTP defines the exact format of requests (HTTP requests) sent from a browser to a Web server as well as the format of responses (HTTP responses) that a Web server returns to a browser. Commercially available browsers include, but are not limited to, Netscape Navigator (America Online, Inc., Dulles, Va.) and Internet Explorer (Microsoft Corporation, Redmond, Wash.). Browsers typically provide a graphical user interface for retrieving and viewing Web pages, applications, and other resources served by Web servers.

Email is used to send electronic messages from one computer to another over the Internet. An email message is made up of binary data, usually in the ASCII text format. An email message is sent in the same way as most Internet data. The TCP protocol breaks an email message into packets and the IP protocol delivers the packets to the receiving computer. The TCP protocol then reassembles the message so that it can be read at the receiving computer. Files other than ASCII text files, i.e., binary files may be attached to an email message. Since the Internet isn't able to directly handle a binary file in email, the binary file must first be encoded in one of a variety of encoding schemes. Common schemes include MIME and uuencode. The receiving computer that receives an email with an attached binary file (called an attachment) must decode the attachment with the same scheme that was used to encode the attachment. Most conventional email software packages do this automatically.

One type of file that is widely used for email attachments is a portable document format (PDF) file developed by Adobe Systems, Inc. of San Jose, Calif. PDF is a universal file format that preserves all the fonts, formatting, graphics, and color of any source document, regardless of the application and platform used to create it. A PDF file is either a 7-bit ASCII file or more preferably a binary file. PDF files are compact and can be shared, viewed, navigated, and printed exactly as intended using reader software, such as Adobe® Acrobat® Reader® software, which is commercially available from Adobe Systems free of charge. Any type of document can be converted to PDF using conversion software such as Adobes Acrobat® 5.0 software available from Adobe Systems. Files in PDF format conventionally end with a ".pdf" extension.

Image files, such as those in tagged image file format (TIFF) are often converted to PDF files for subsequent transmittal over the Internet by email. TIFF is one of the most widely supported file formats for storing bit-mapped images on personal computers (both PCs and Macintosh computers). TIFF graphics can be any resolution, and they can be black and white, gray-scaled, or color. Files in TIFF format conventionally end with a ".tif" extension.

BRIEF DESCRIPTION OF THE DRAWINGS

The features, aspects, and advantages of the present invention will become better understood with regard to the following description, appended claims, and accompanying drawings where:

FIG. 1 is a directory page showing folders and project files in an IMT software system;

FIG. 2 is a first page in a project file for general project information;

FIG. 3 is a second page in the project file for general project information;

FIG. 12 is the second page in the PDF panel image and information file; and

DETAILED DESCRIPTION OF THE PREFERRED EMBODIMENTS

As used herein, the term "finish" shall mean the texture, color, gloss and other properties affecting the final appearance of a wood product after the wood product has been manufactured, physically treated, and stained, sealed, glazed, lacquered or otherwise treated with finish products.

As used herein, the term "stain" shall mean a transparent or semitransparent solution or suspension of coloring matter (such as dyes or pigments or both) in a vehicle (binder and thinner), designed to color a piece of wood by penetration without hiding it or leaving a continuous film. Stains have low solids contents relative to paint, i.e., less than percent by weight solids. Stains can be oil-based or water-based. Oil-based stains generally comprise one or more pigments, a binder such as an alkyd resin containing a drier, and organic solvents such as mineral spirits, VMP naphtha, kerosene, xylene, toluene or a mixture of these. In contrast, water-based stains have waterborne binders such as acrylic emulsions and water dilutable alkyds.

As used herein, the term "glaze" shall mean a semitransparent pigmented coating having a composition similar to a stain, but designed to be applied over a sealed or painted wood substrate to accent, highlight, or provide uniform color. To achieve different looks, glazes can be used in a variety of decorative application techniques, such as ragging, sponging, stippling and marbling.

Figure 13:
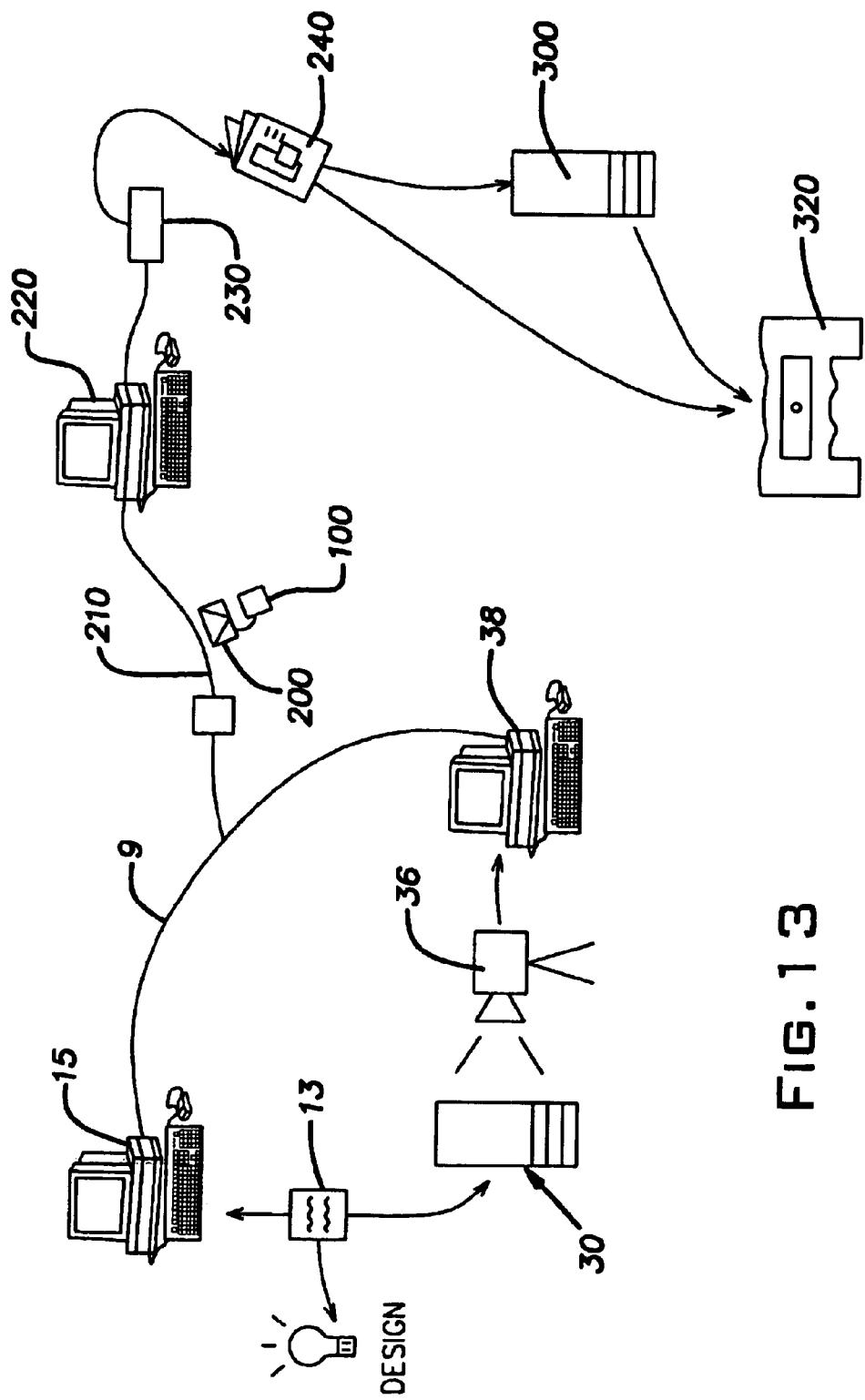
FIG. 13 shows a schematic diagram of the method of the present invention.

The present invention is directed to a method of finishing a wood product 320 (shown in FIG. 13), such as furniture, that is being manufactured at a location remote from a location where the finish for the wood product 320 is designed. The method uses a proprietary information management and tracking (IMT) software system in conjunction with a digital image production and management (DIPM) system to produce a wood finish information file that is transmitted via email over the Internet from the design location to the remote location. A schematic diagram of the method of the present invention is shown in FIG. 13.

The IMT software system runs on an internal network, or intranet 9, which includes one or more centrally located servers connected to a plurality of geographically dispersed clients, such as personal computers. The intranet 9 uses the TCP/IP network communication protocol and provides access to the Internet and the Web through a firewall. The server(s) run under a server operating system, such as Microsoft Windows NT (available from Microsoft Corp. of Redmond, Wash.), Netware (available from Novell of Provo, Utah) or UNIX (available from Novell), while the clients run under a client operating system, such as Microsoft Windows 9x or 2000.

The IMT software system includes a relational database, which preferably uses structured query language ("SQL") compliant commands. The database may be a commercially available database such as Oracle from Oracle Corporation, Sybase from Sybase, Inc., or DB2 from International Business Machines. The IMT software system further includes a graphical user interface (GUI) software application that retrieves and updates information from the database. The GUI software application preferably provides a forms style user interface, wherein information is entered and retrieved through pages or sheets having dedicated spaces for inserting and viewing specific types of information. Some of these sheets are discussed in more detail below. The GUI software application is preferably created using rapid deployment, object-oriented software interface development tools for SQL compliant databases. One such suitable tool is Power-Builder® software available from PowerSoft Corporation.

The IMT software system provides access to a formula management software application that stores finishing product information (such as formulas, physical and chemical properties, and safety information) in a database and permits the manipulation of such information for regulatory, development and other purposes. A suitable commercially available software application that may be used for the formula management software application is ProductVision® from Advanced Software Designs. ProductVision®) is a client/server, Windows-based product.

Figure 1:
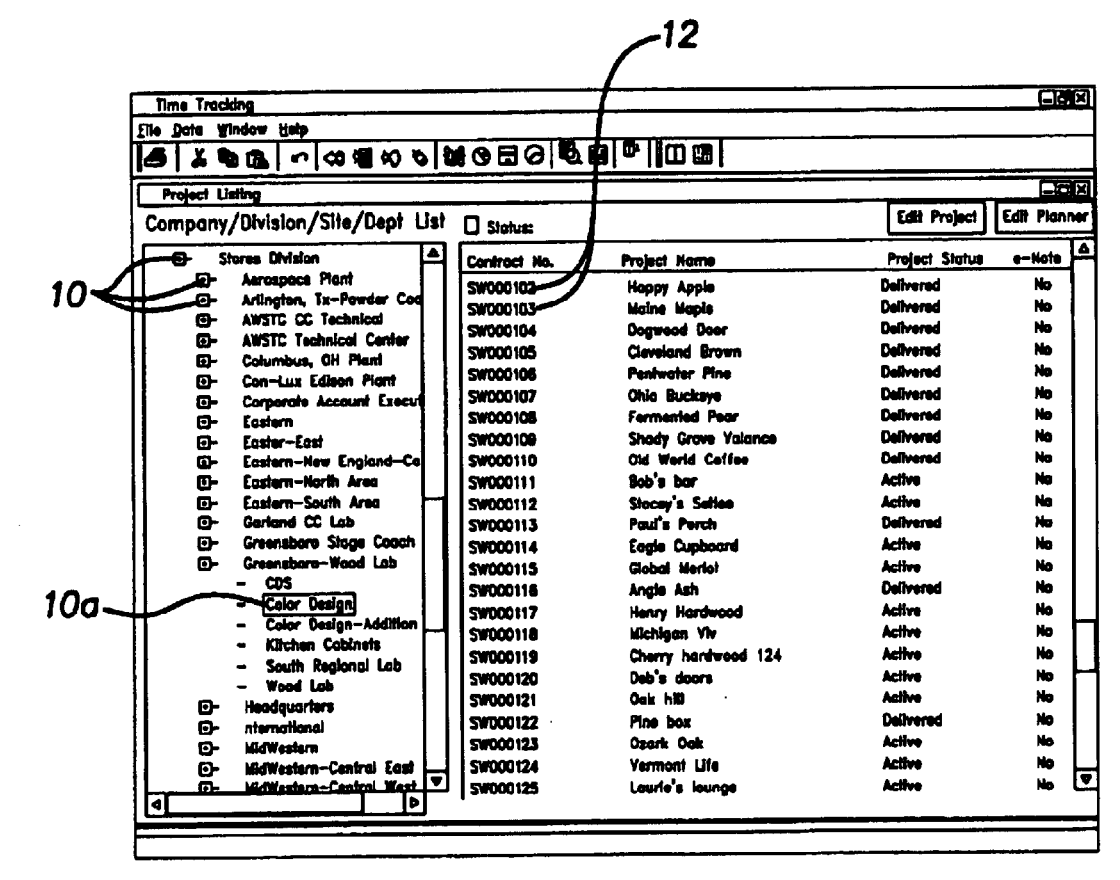
Figure 2:
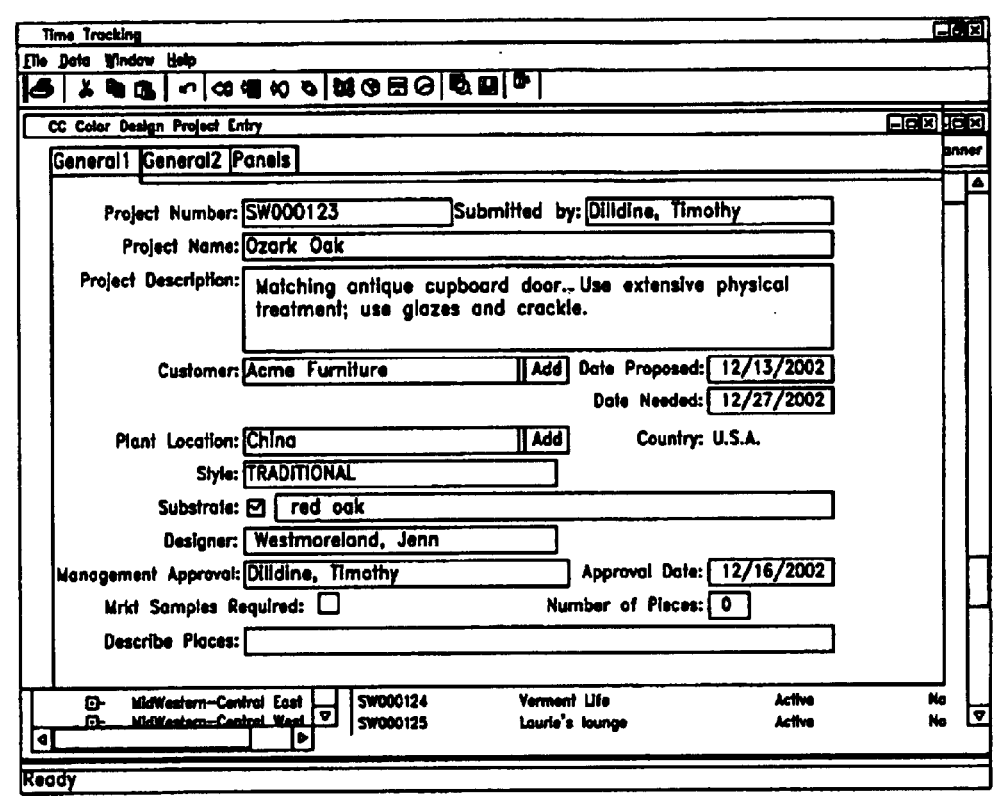
Figure 3:
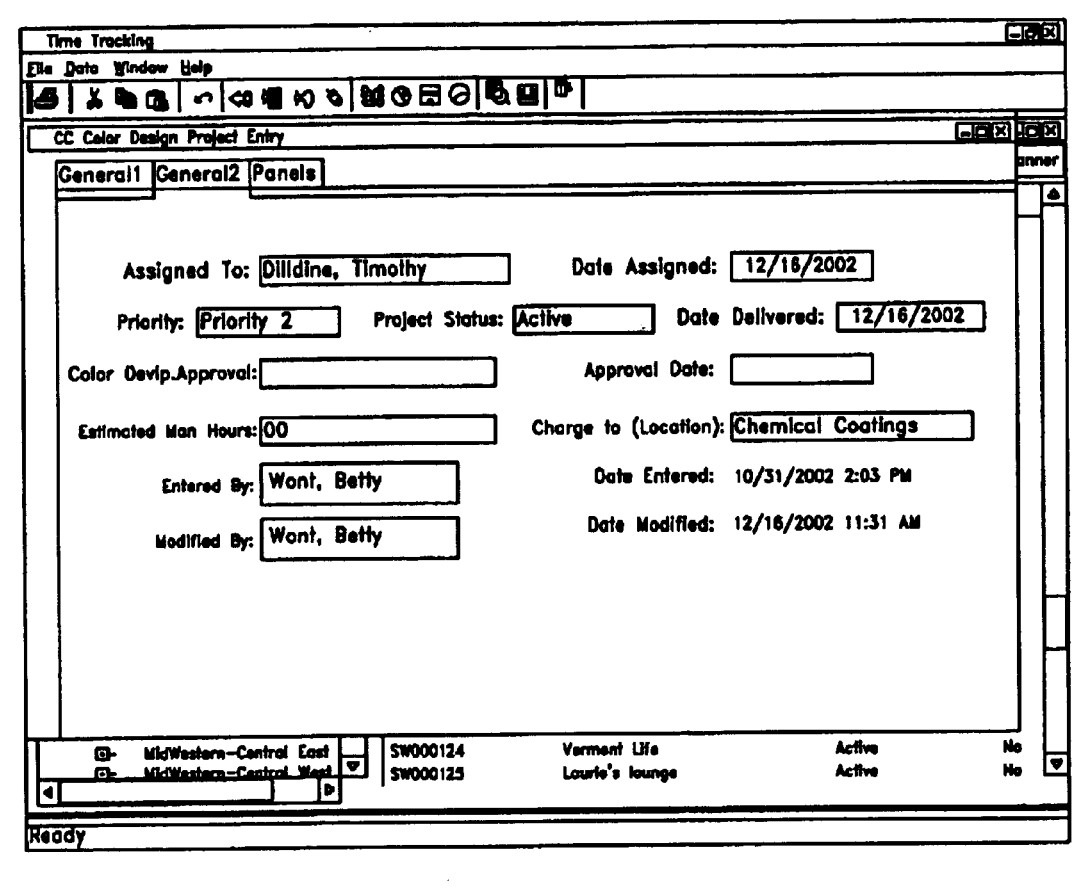
Figure 4:
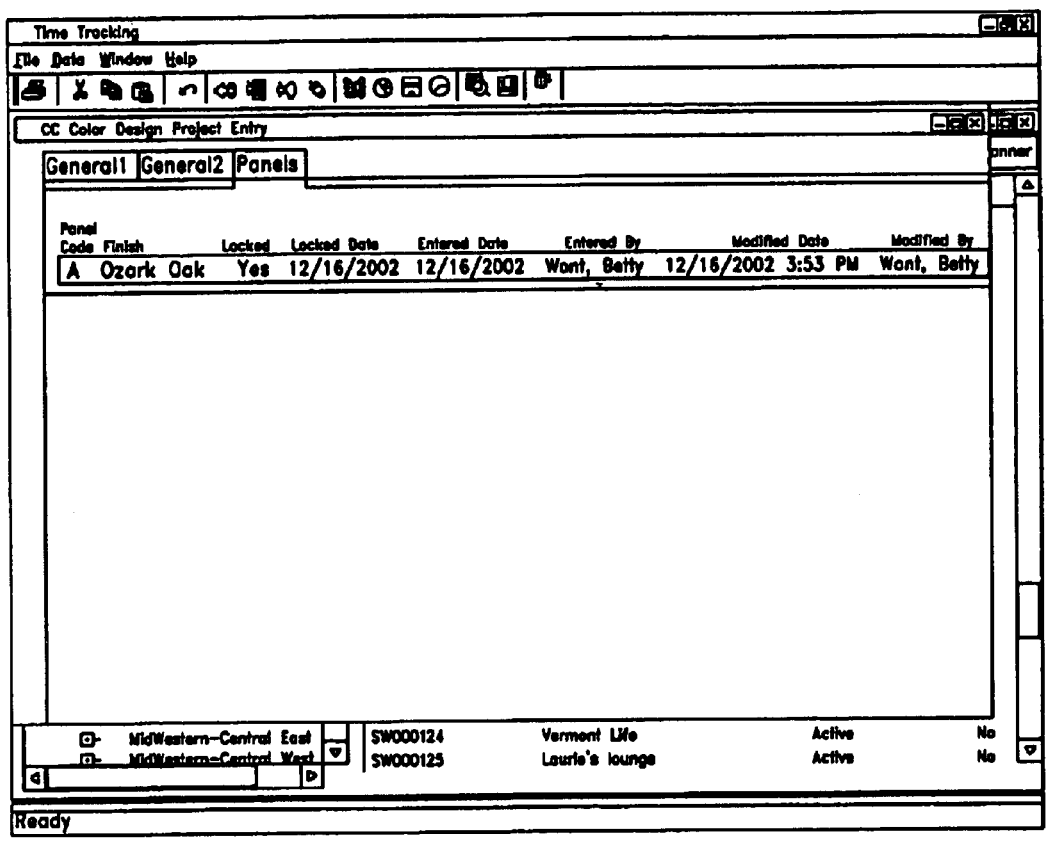
FIG. 4 is a third page in the project file for a brief summary of information on a wood panel.

The IMT software system stores and manages information on customer projects involving a variety of different coatings applications, including wood product finish applications. Such information includes general project information, such as contract number, project name, project description and project status. For wood product finish projects, the stored and managed information further includes specific finish information, as will be described more fully below. The information may be arranged in folders 10 by corporate division, group and location as shown in FIG. 1. For a particular folder 10 (such as "Color Design" 10a) information may be arranged in files 12 by contract number. When a file 12 (such as "SW000123") is initially opened, three pages are accessible through tabs, namely "General 1", "General 2" and "panels", as shown in FIGS. 2, 3 and 4. As shown, the General 1 and General 2 pages contain the general project information, while the Panels page provides access to three additional pages containing the specific finishing information.

In a first step of the method, the wood finish is designed, typically by a wood product designer (such as a furniture designer) in conjunction with a finish specialist. In designing the wood finish, the style of the wood product and the type of wood used to form the wood product are typically taken into account. The design of the wood finish may be selected from an existing source, such as from a graphics library of wood finishes, or from a periodical, or from another wood product. Alternately, the design of the wood finish may be an adaptation of an existing wood finish or may be a totally new creation. The design of the wood finish is typically completed at a design facility operated by a coatings manufacturer located proximate to the business location of the wood product designer. Since many of the furniture and other wood product designers in the U.S. are located in North Carolina, it is convenient to have the design facility located in North Carolina.

Once the design of the wood finish is completed, the finish specialist determines the wood treatment and coating steps required to achieve the wood finish, i.e., creates a finishing schedule. The finishing schedule is tailored to the specific type of wood that will be utilized at the remote location to manufacture the wood product. The finishing schedule sets forth the physical treatment steps, e.g., creating wormholes, rasping, clinking, etc., and the product application steps, e.g. applying stains, lacquers, glazes, etc., and the order in which they are performed. The finishing schedule may further include pre and post finish information, as well instructional information on how to create the finish. The finishing schedule is typically developed through an iterative procedure. An exemplary finishing schedule is set forth below:

1. wormhole, clinker, rasp (physically treat the wood to create these effects)
2. Sherstain HA5886S90 (apply specific wood stain denoted by product number)
3. Lacquer, 10 sheen (apply lacquer of a particular sheen)
4. Powder glaze HA57899S2 (apply specific powder glaze denoted by product number)
5. Glaze TDD478 (apply specific glaze denoted by product number)
6. Spatter stain (apply spatter stain)
7. Crackle/sand per standard (apply crackle coating & sand)
8. Lacquer, 10 sheen (apply lacquer of a particular sheen).

Figure 5:
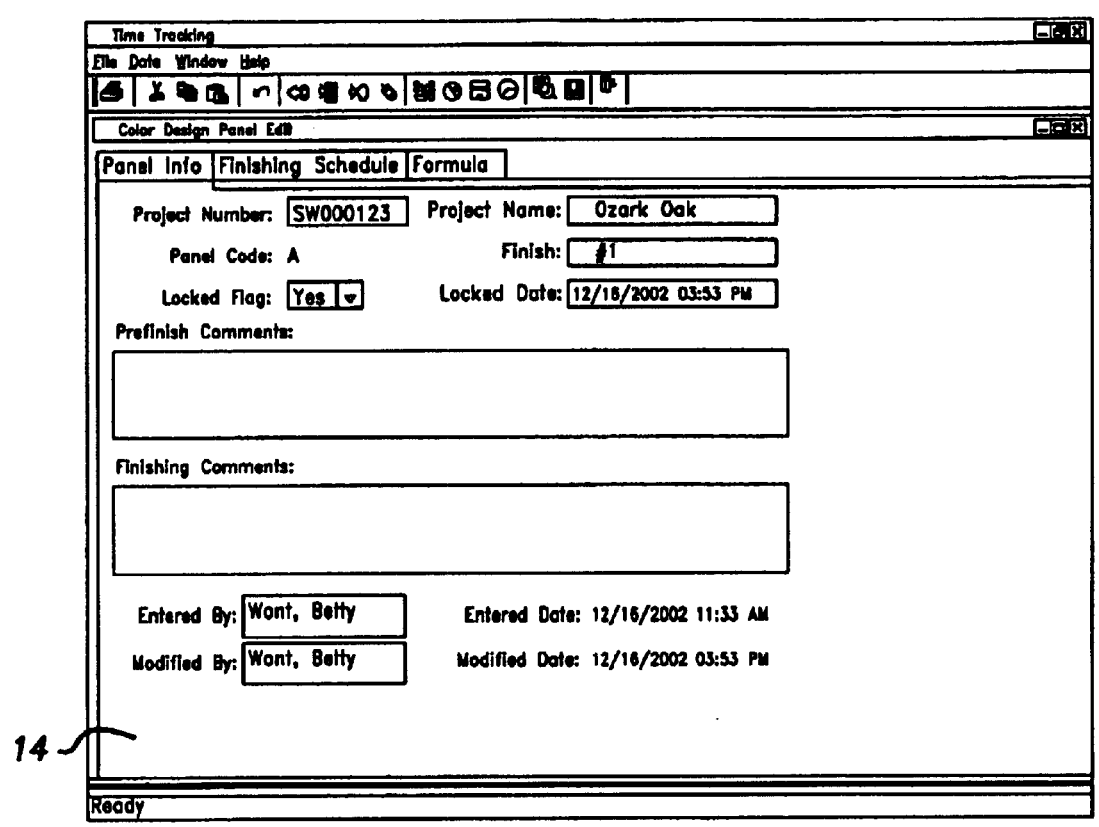
FIG. 5 is fourth page in the project file for more information on the wood panel.
Figure 6:
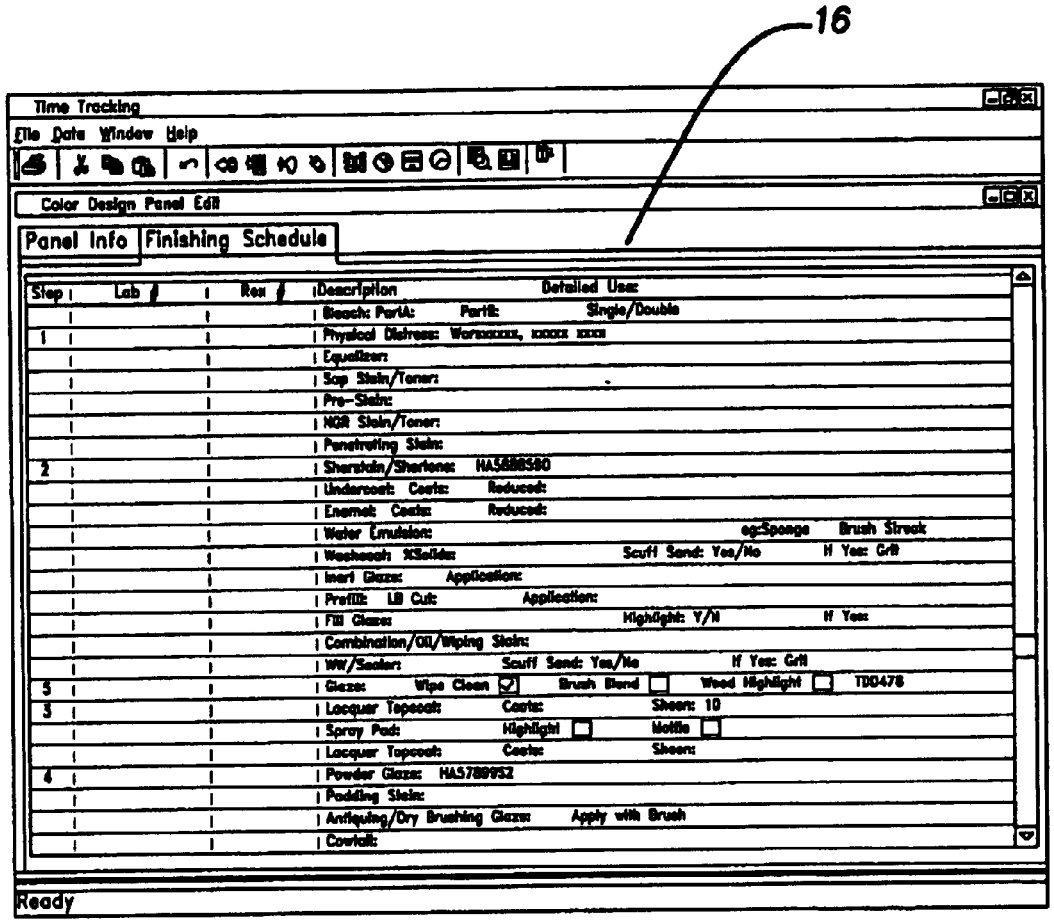
FIG. 6 is a top portion of a fifth page in the project file for a finishing schedule for the wood panel.
Figure 7:
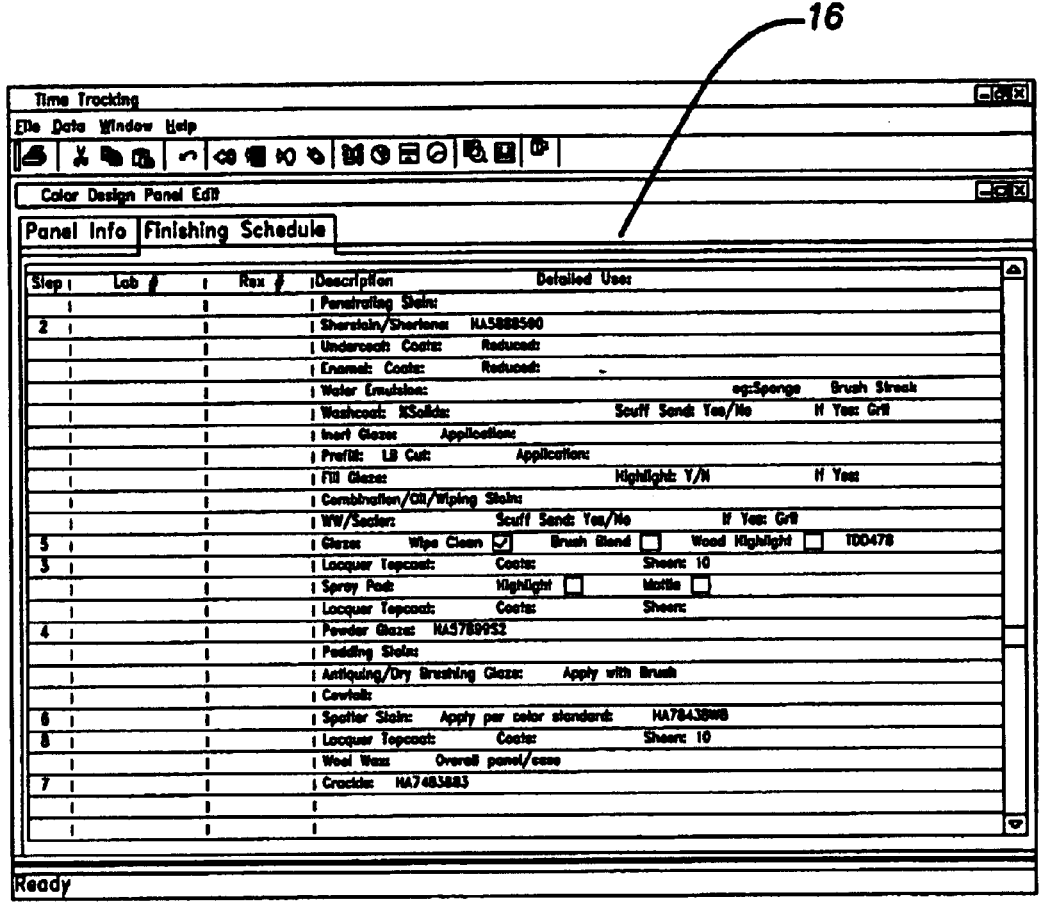
FIG. 7 is a bottom portion of the fifth page (scrolled down) in the project file for the finishing schedule for the wood panel.
Figure 8:
FIG. 8 is a finishing schedule form for manual entry of finishing schedule information.
Figure 8:

The finishing specialist typically fills out (in handwriting) a finishing schedule form 13 (shown in FIG. 8) setting forth the steps in the finishing schedule. The information on the finishing schedule form 13 is then entered into the IMT software system through a personal computer 15 by the finishing specialist or data entry personnel. More specifically, a file 12 for the project (such as SW000123) is opened and general project information is entered into the General 1 and General 2 pages (shown in FIGS. 2 and 3). The Panels page is opened and edited to access the finishing schedule pages through tabs. The finishing schedule pages are Panel Info 14 (shown in FIG. 5), Finishing Schedule 16 (shown in FIGS. 6 and 7) and Formulas (not shown). Pre-finish and finishing comments are entered into the Panel Info page 14 as shown. The finishing schedule information (including the finish product numbers) is then entered into the Finishing Schedule page 16 as shown. When the Formulas page is accessed, the formulas for the finish products entered into the Finish Schedule page 16 are automatically retrieved from the formula management software application and displayed on the Formulas page.

When all of the general project information and specific finish information has been entered into the IMT software system, the Panel Info, Finish Schedule and Formula pages are printed (exported) to Adobe® Acrobat® software (which is loaded into the same or another personal computer) and converted into PDF finish information files.

Figure 9:
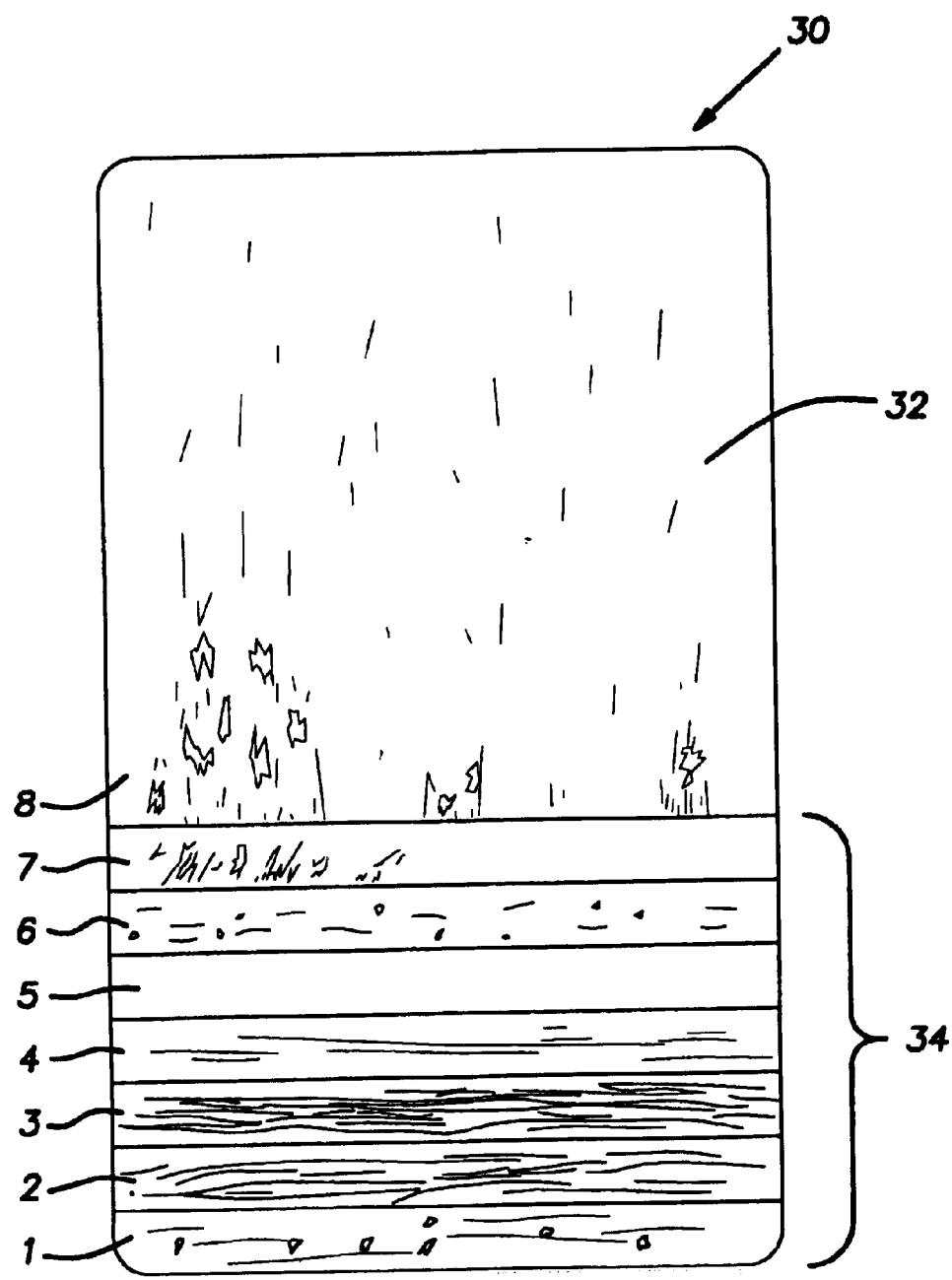
FIG. 9 is a schematic drawing of a wood panel.

Once the finishing schedule has been developed, a first wood panel 30 is obtained that is composed of the same wood as that which will be used to manufacture the wood product at the remote location. The first wood panel 30 is sanded and otherwise prepared for finishing in the same manner that the wood product will be prepared during manufacturing at the remote location. As shown in FIG. 9, the first wood panel 30 is partitioned into two segments, a large full finish segment 32 and a stepped segment 34. In the full finish segment 32, the first wood panel 30 is completely finished, i.e., the entire full finish segment 32 is treated according to the complete finishing schedule. In the stepped segment 34, the first wood panel 30 is divided into a series of sections, wherein each section is only treated according to the finishing schedule up to a particular step. For example, section 1 only shows the physical treatment of the first wood panel 30, whereas section 3 shows the physical treatment of the first wood panel 30 and the application of Sherstain HA5886S90 and lacquer, 10 sheen to the first wood panel 30. Continuing to section 8 (which is the full finish segment 32), the full treatment of the first wood panel 30 is shown, i.e., all 8 steps of the finishing schedule have been performed on the first wood panel 30.

Once the first wood panel 30 has been treated as set forth above, the first wood panel 30 is taken to a photography studio, where the DIPM system is located. The photography studio is preferably located at the design facility or proximate thereto. The DIPM system includes a digital camera 36 (and associated equipment) and a graphic design software program.

In the photography studio, the first wood panel 30 is illuminated by D5000D6000 lighting. As is known in the photography art, light sources are characterized by their color temperature, expressed in degrees Kelvin(K). A 100-watt tungsten lamp, as standardized by the CIE (Commission Inernationale d'Eclairage) in 1931, has a color temperature of 2856 K Indoor fluorescent light is represented by 4100 K and daylight from an overcast sky by 6500 K. ANSI D5000 is a reddish light which was derived and standardized to allow for a standard light source for all images to be viewed under and is a compromise between the CIE D6500 Daylight Illuminant standard and the D3200–4100 K of photographic and office lighting.

After the first wood panel 30 is illuminated, the white balance for the photography session is set. White balance is a system for correcting color in response to different lighting conditions. Normally, the human eye compensates for different lighting conditions; however, a digital camera has to find the "white point" (the assumption that a white object must appear white) to correct other colors cast by the same light. Many digital cameras feature automatic white balance, wherein the camera looks at the overall color of the image and calculates the best-fit white balance. Software programs are also commercially available for calculating white balance. An example of such a software program is Nikon Capture 2.

Once the lighting and white balance are set, a digital image or picture of the entire first wood panel 30 (i.e., a full view) is taken using the digital camera 36, which is preferably a Nikon DIX digital camera. The digital camera 36 is connected by a firwire IEEE1394 to an Imac mobile computer stand with Nikon Capture 2 loaded therein. The digital image is captured in Adobe 1998 RGB (red, green, blue) color space, Nikon version and a raw NEF file. The digital image is saved as a 16 bit Tiff RGB file and is then transferred to an image station personal computer 38, such as a MAC G-4. The image station personal computer 38 is located next to a lightbox having a D5000K light source, such as the Executive Viewing Station, available from GTI Graphic Technology, Inc. The graphic design software program is loaded on the image station personal computer 38 and is operable to adjust the color, clarity and sharpness of the digital image. Examples of suitable graphic design software programs include Adobe® Photoshop® and Quark Xpress®. Preferably, the graphic design software program is Adobe® Photoshop® 7.0.

Using the graphic design software program, the digital image is opened and assigned an ICC profile. The digital image is displayed on a monitor screen of the image station personal computer 38 for viewing by a color specialist. The first wood panel 30 is placed into the lightbox so that the color specialist can view both the monitor screen and the first wood panel 30. With the first wood panel 30 and the digital image displayed next to each other in this manner, the color specialist adjusts the color, clarity and sharpness of the digital image to match the first wood panel 30 using the graphic design software, as described below.

Initially, the graphic design software is in the RGB color space and the digital image is displayed in an 8 bit mode. The color specialist changes the mode of the digital image to 16 bit and then manipulates the brightness and contrast and hue and saturation controls of the graphic design software to adjust the color of the digital image to match that of the first wood panel 30. The color specialist then changes the color space of the graphic design software to L*a*b* (Lightness to darkness, red to green, yellow to blue) mode and changes the mode of the digital image back to 8 bit. Using a luminance channel (channels pallette, lightness channel) in the graphic design software, the color specialist adjusts the sharpness with threshold of 1, range 1–3 and 80–120%. The color specialist then changes the graphic design software back to the RGB color space and saves the digital image as a TIFF file with layers (with a ".a.tiff" extension), using the contract number as the file name. The digital image is saved as an 8×10 maximum image size.

In lieu of having one full view image of the first wood panel 30 saved as one TIFF file, the color specialist may separate the stepped segment of the first wood panel 30 from the full finish segment of the first wood panel 30 to create two images, a full finish image and a partial stepped image, which are saved as two TIFF files (with ".a.tiff" and ".b.tiff" extensions).

Following the same procedure as that set forth above for the full view of the first wood panel 30, a digital picture is taken of only a portion (typically an 8×10 inch portion) of the first wood panel 30, using macro lens, to scale. The color, clarity and sharpness of the resulting scale or detailed image is then adjusted to match the first wood panel 30 using the same procedure set forth above for the full view image of the first wood panel 30. The detailed image of the first wood panel 30 is saved as a TIFF file (with a ".b.tiff" or ".c.tiff" extension, depending on whether a full view image or a fill finish image and stepped image is used).

All TIFF files for the first wood panel 30 and other wood panels produced for other projects are saved in an Image Library located on a secondary hard drive on the imaging station personal computer. The Image Library is backed up monthly to both disc and alternate storage space.

The IMT software system may be searched to identify projects having finishes with particular attributes. Using the numbers of the identified projects, digital images of the finishes may be retrieved from the Image Library.

The TIFF file for the full view image (or the TIFF files for the full finish image and the stepped image) and the TIFF file for the detailed image of the first wood panel 30 are placed into a pre-made TIFF template. A corporate logo, a design center logo, contract number, project name and customer name are also entered into the TIFF template. At least one copy of the TIFF template is printed out on an inkjet soft proofing printer and is saved in the design center files. Other copies of the TIFF template may be produced for distribution outside the design center, such as for provision to the wood product designer. A Rhem light indicator patch is attached to those copies distributed outside the design center to alert a viewer when the lighting is appropriate for viewing color. Small Rhem light indicator patches with adhesive backing are commercially available from the Graphic Arts Technical Foundation (GTF) located in Sewickley, Pa. Under standard lighting (5,000K), the GATF/Rhem light indicator patch appears as a solid magenta patch. Under non-standard lighting, however, broad stripes of two magenta metameric colorants that comprise the indicator patch become readily apparent.

Figure 10:
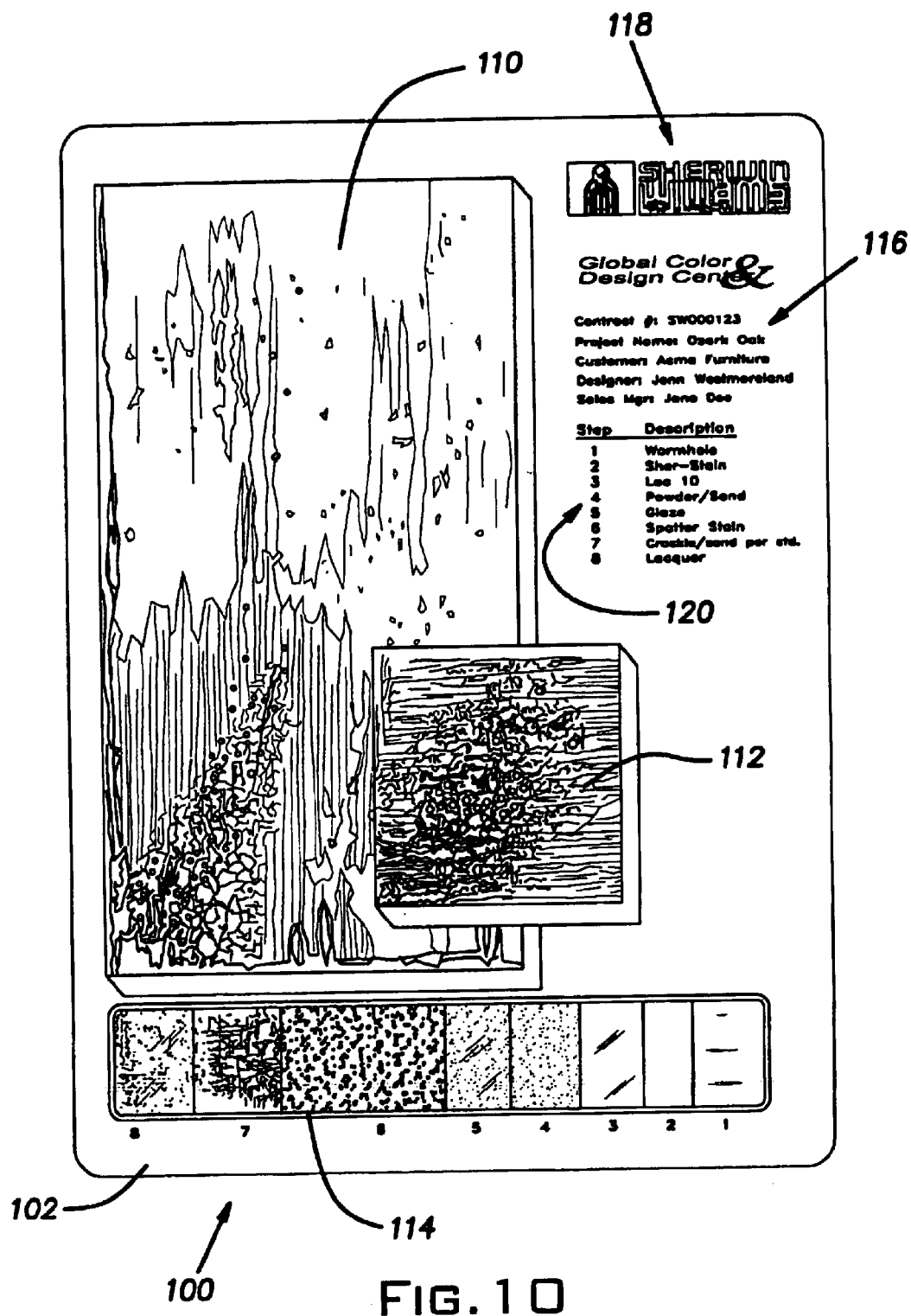
FIG. 10 is the first page in a PDF panel image and information file.
Figure 11:
FIG. 11 is the second page in the PDF panel image and information file.
Figure 12:
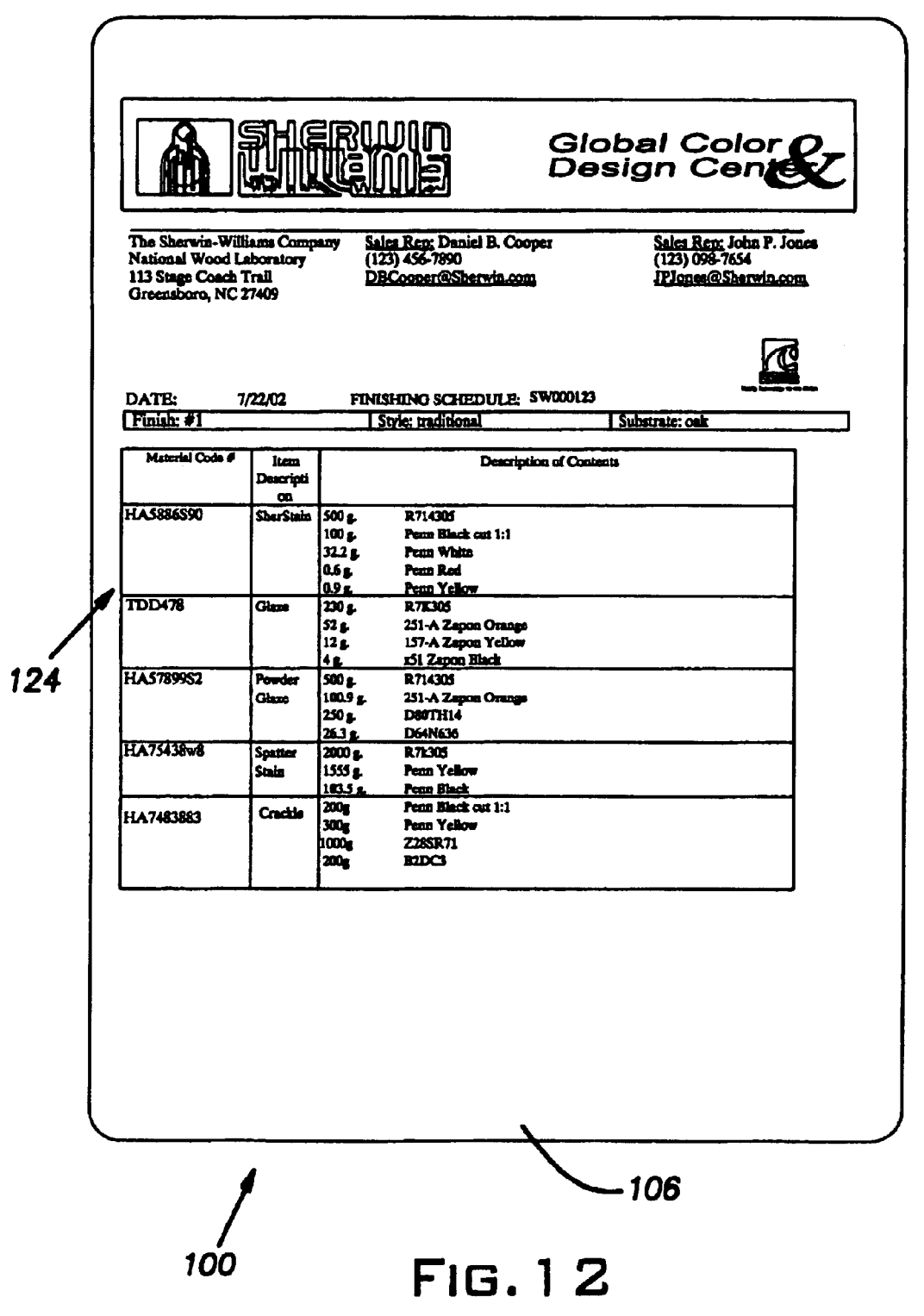

Using Adobe® Acrobat® software, the TIFF template is converted to a PDF panel image file. The PDF finish information files are then merged into the PDF panel image file to create a single PDF panel image and information file 100, shown in FIGS. 10, 11, and 12. The PDF panel image and information file 100 comprises first, second, and third pages 102, 104, 106. On the first page 102, the image (denoted by numeral 110) of the full finish segment 32 is displayed, slightly off center, to the left and toward the top. The detailed image (denoted by numeral 112) of the first wood panel 30 is disposed over a portion of the image 10 of the full finish segment 32 and the image (denoted by numeral 114) of the stepped segment 34 is disposed below the image 110 of the fill finish segment 32 and the detailed image 112. Basic information (denoted by numeral 116) including the contract number, project name, customer, designer and sales manager are listed below a corporate and design center logo (denoted by numeral 118). A brief summary (denoted by numeral 120) of the finishing schedule is located below the basic information 116. The second page 104 contains pre-finish comments, the finishing schedule (denoted by numeral 122) and post finishing comments. On the third page 106, the formulas (denoted by numeral 124) for the finishing products used in the finishing schedule 122 are set forth.

The PDF panel image and information file 100 is attached to an email and is sent internally along the intranet 9 to a testing personal computer within the design center. The file is opened and is tested for color, clarity, sharpness and quality control of the color management system. If the PDF panel image and information file 100 passes this internal test, it is attached to an email 200 and sent over the Internet 210 to a manufacturing facility at the remote location, or more preferably to a coatings facility at the remote location. If the email 200 is sent to the coatings facility, the coatings facility is preferably located proximate to the manufacturing facility.

At the remote location, a personal computer 220 receives the email 200. The monitor of the personal computer 220 is set to Adobe 1998 RGB color space, with current calibration. A technician opens the email 200 and detaches the PDF panel image and information file 100 attached thereto. The technician opens the PDF panel image and information file 100, applies the proper printer profile (which is created using Gretag-Macbeth software/hardware) to the image and prints the same to a local calibrated/profiled color printer 230. The resulting design print 240 contains the images 110, 112, 114 of the first wood panel 30, which have the same color and appearance as the first wood panel 30 located at the design facility. A GTF Rhem light indicator (not shown) may be attached to the design print to ensure that the design print is viewed under proper lighting conditions. The design print 240 (containing the images 110, 112, 114 of the first wood panel 30 and the specific finishing information) is provided to a finish specialist located at the remote location.

Using the formulas 124 for the specified finish products contained in the design print 240, the finish specialist prepares the finish products from the specified raw materials and tints, which may be locally obtained or imported. Regardless of their origin, the raw materials and tints must meet the same exacting standards and specifications as the raw materials and tints that are used to produce the finish products at the design facility. In this manner, the finish products used to produce the finishes on the second wood panel 300 and the manufactured wood product are the same as the finish products used to produce the finish on the first wood panel 30, thereby facilitating the matching of the finishes on the second wood panel 300 and the manufactured wood product to the finish on the first wood panel 30.

The finish specialist obtains a second wood panel 300 composed of the same wood as that which will be used to manufacture the wood product at the manufacturing facility. The second wood panel 300 is sanded and otherwise prepared for finishing in the same manner that the wood product will be prepared during manufacturing. Using the images 10, 112, 114 of the first wood panel 30 in the design print and the finishing schedule 122 in the design print, the finish specialist performs the specified finishing steps on the second wood panel 300 using the specified finish products. In the same manner as with the first wood panel 30, the second wood panel 300 is finished so as to have a full finish segment and a stepped finish segment. After each step of the finishing schedule 122, the finish specialist compares the second wood panel 300 to the corresponding step on the printed image 114 of the stepped segment 34 to ensure that they have the same color and appearance. During the comparisons, the printed images 110, 112, 114 and the second wood panel 300 are illuminated with D5000K lighting in a lightbox, preferably an Executive Viewing Station. If, during any step of the finishing process, the second wood panel 300 does not have the same color and appearance as the corresponding step on the printed image 114 of the stepped segment 34, the finish specialist modifies the finishing step so that the second wood panel 300 matches the step on the printed image 114 of the stepped segment 34. In making any such modification, the finish specialist uses techniques known in the art of wood finishing. This step by step finishing and comparison procedure is continued until all of the specified finishing steps are completed, at which time, the second wood panel 300 is compared to the printed images 110, 112 of the fill finish segment 32, once again under D5000K lighting. At this point, the second wood panel 300 should have the same color and appearance as the printed images of the first wood panel 30 (which is the same as the actual appearance of the first wood panel 30 located at the design facility).

The finished second wood panel 300 and the specific finishing information from the PDF panel image and information file 100 (including any modifications made by the finish specialist during the finishing of the second wood panel 300), as well as the specified finish products are physically transported to the manufacturing facility, where they will be used to create the finish on the manufactured wood product 320, using substantially the same procedure as that used to produce the second wood panel 300, except the second wood panel 300 is used for the comparison testing instead of the digital images 110, 112, 114 in the design print.

In order to facilitate the matching of the finishes on the second wood panel 300 and the manufactured wood product 320 to the finish on the first wood panel 30, the equipment used at the remote location (e.g. the lightboxes, computers, monitors and printers) are preferably the same as the equipment used at the design facility and are provided with the same calibration.

Prints of all PDF panel image and information files received via email at the remote location are saved in a hardcopy library at the remote location. A digital library of all PDF panel image and information files received via email at the remote location is also maintained at the remote location. Preferably, the prints are compared to the files on a weekly basis to determine the need for additional calibration/profile manipulation. On a bimonthly basis, RGB test charts are printed from the printers at the remote location and are physically sent to the design center for calibration/profiling of the printers (using Gretag-Macbeth Spectroscan). All system monitors at the design center and the remote location are calibrated weekly using Gretag-Macbeth software/hardware color management system.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A method of providing a wood product with a finish at a location remote from where the finish is designed, said method comprising the steps of:
   (a.) designing the wood finish at a design facility;
   (b.) developing a finish schedule to create the wood finish, said finish schedule comprising a plurality of finishing steps utilizing a plurality of finish products;
   (c.) obtaining formulas for the finish products;
   (d.) creating at least one PDF finish information file containing the finish schedule and the formulas;
   (e.) providing a first wood panel composed of the same wood as the wood product;
   (f.) performing the finishing steps on the first wood panel in accordance with the finishing schedule;
   (g.) using a digital camera, creating at least one digital image of the first wood panel at the design facility;
   (h.) adjusting the at least one digital image to have the same color and appearance as the first wood panel;
   (g.) converting the at least one digital image into at least one PDF image file;
   (h.) merging the at least one PDF finish information file and the at least one PDF image file to form a PDF image/information file;
   (i.) attaching the PDF image/information file to an email and sending the email with the attached PDF image/information file from the design facility to a second location remote from the design facility;

(j.) opening the email at the second location and printing the PDF image/information file to obtain a design print containing the finish schedule and the formulas and at least one printed image of the first wood panel;

(k.) at the second location, providing a second wood panel composed of the same wood as the wood product;

(l.) performing the finishing steps on the second wood panel in accordance with the finishing schedule in the design print, wherein at least once during or after the performance of the steps, the color and appearance of the second wood panel is compared to the color and appearance of the printed image of the first wood panel; and (m.) performing the finishing steps on the wood product in accordance with the finishing schedule in the design print, wherein at least once during or after the performance of the steps, the color and appearance of the wood product is compared to the color and appearance of the second wood panel.

* * * * *

UNITED STATES PATENT AND TRADEMARK OFFICE
CERTIFICATE OF CORRECTION

| | |
|---|---|
| PATENT NO. | : 6,892,105 B2 |
| APPLICATION NO. | : 10/744191 |
| DATED | : May 10, 2005 |
| INVENTOR(S) | : John D. Draughn and Jennifer M. Westmoreland |

It is certified that error appears in the above-identified patent and that said Letters Patent is hereby corrected as shown below:

In the Specification

Column 3, Line 19, delete "fbr", insert --for--.

Column 3, Line 55, delete "than percent", insert --than 20 percent--.

Column 5, Line 1, delete "panels", insert --Panels--.

Column 6, Line 43, delete "D5000D6000", insert --D5000-D6000--.

Column 7, Line 66, delete "fill", insert --full--.

Column 8, Line 41, delete "10", insert --110--.

Column 8, Line 44, delete "fill", insert --full--.

Column 9, Line 36, delete "10", insert --110--.

Column 9, Line 60, delete "fill", insert --full--.

Signed and Sealed this
Twenty-eighth Day of July, 2015

Michelle K. Lee
*Director of the United States Patent and Trademark Office*